Nov. 10, 1942.   O. M. WHITTEN   2,301,599
MASTER CYLINDER
Filed March 31, 1941   2 Sheets-Sheet 1
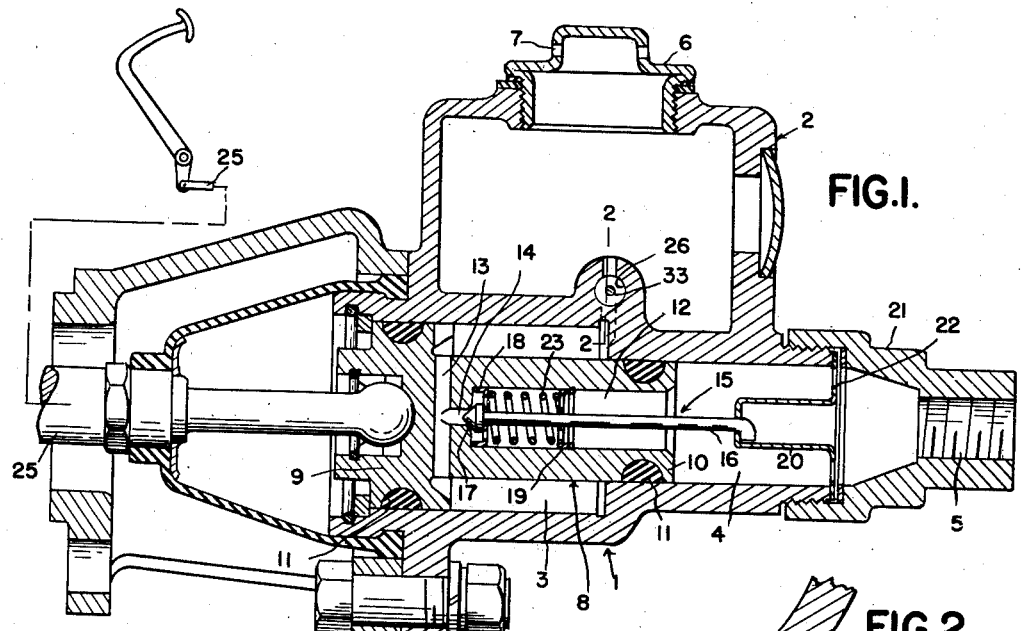
FIG.1.
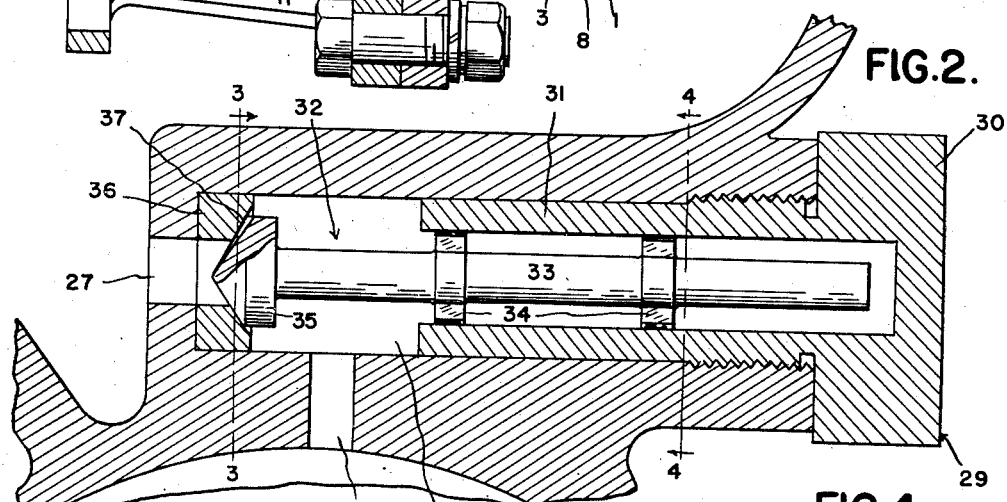
FIG.2.
FIG.4.
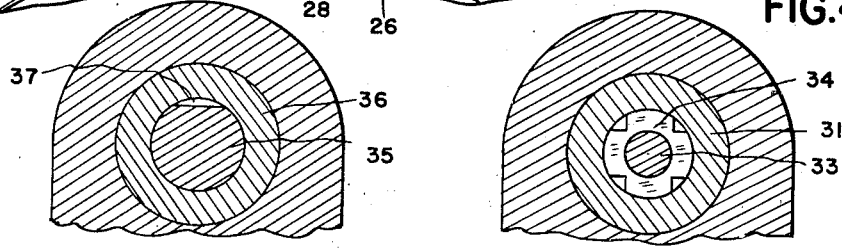
FIG.3.
INVENTOR
OWEN M. WHITTEN
BY
ATTORNEYS Nov. 10, 1942.        O. M. WHITTEN         2,301,599
MASTER CYLINDER
Filed March 31, 1941        2 Sheets—Sheet 2
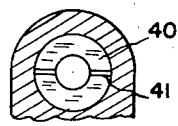
FIG.6.
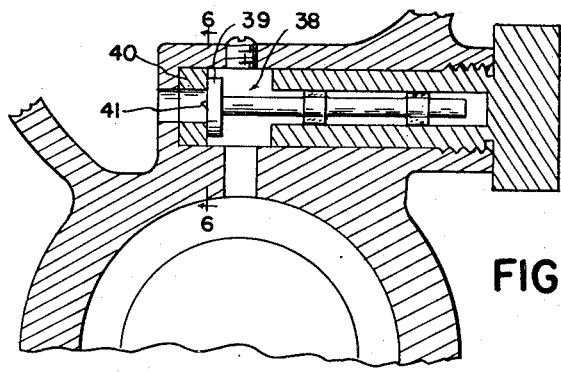
FIG.5.

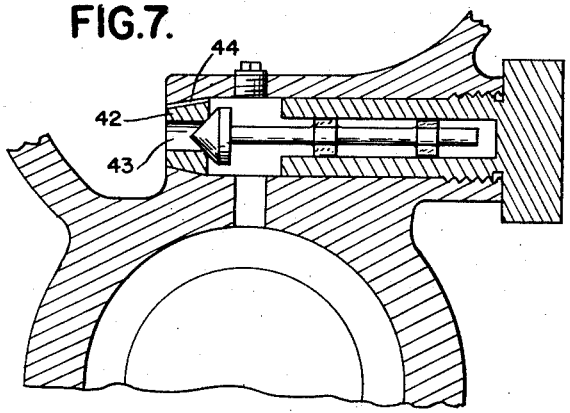
FIG.7.
FIG.10.
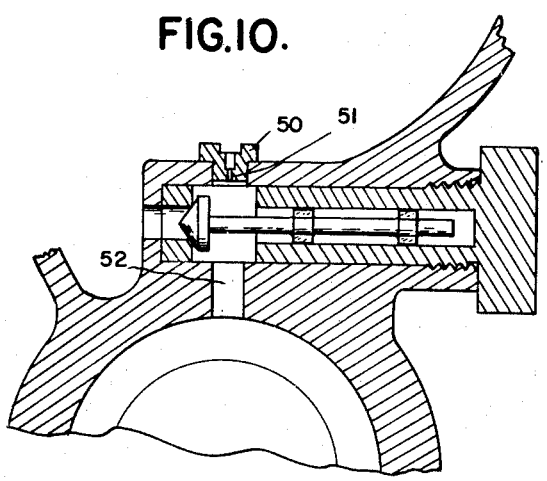
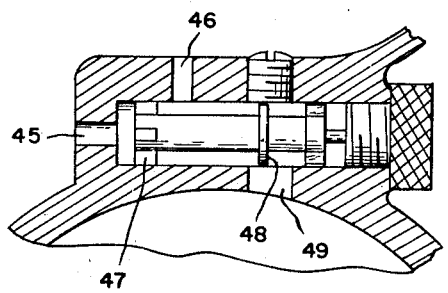
FIG.9.
INVENTOR
OWEN M. WHITTEN
BY
ATTORNEYS Patented Nov. 10, 1942

2,301,599

UNITED STATES PATENT OFFICE 2,301,599

MASTER CYLINDER

Owen M. Whitten, Detroit, Mich., assignor to Kelsey-Hayes Wheel Company, Detroit, Mich., a corporation of Delaware Application March 31, 1941, Serial No. 386,168

5 Claims. (Cl. 60—54.6)

The invention relates to master cylinders and refers more particularly to master cylinders for use especially in hydraulic brake systems.

The invention has for one of its objects to provide an improved master cylinder for supplying fluid under pressure at a greater rate during the initial portion of the operation than during the final portion.

The invention has for another object to provide an improved control device in the communication between the reservoir and the cylinder of larger diameter to secure the desired operation for supplying fluid under pressure and for effectively replenishing the fluid.

These and other objects of the invention will become apparent from the following description, taken in connection with the accompanying drawings, in which:

Figure 1 is a vertical sectional view of a master cylinder embodying my invention;

Figure 2 is an enlarged cross section on the line 2—2 of Figure 1;

Figure 8:
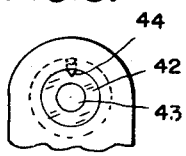

Figures 3 and 4 are cross sections on the lines 3—3 and 4—4, respectively, of Figure 2;

Figure 5 is a view similar to Figure 2 showing a modification;

Figure 6 is a cross section on the line 6—6 of Figure 5;

Figures 7 and 8 are views similar to Figures 5 and 6, respectively, showing another modification;

Figures 9 and 10 are views similar to Figure 2 showing other modifications.

The master cylinder, as illustrated, forms part of the hydraulic brake system of a motor vehicle and is adapted to force the braking fluid to the cylinders for applying the wheel brakes. The master cylinder is formed with the cylinder member 1 in the lower part of its body and with the fluid reservoir 2 in the upper part. The cylinder member has the axially aligned cylinders 3 and 4 of different diameters, the former being of larger diameter than the latter. The cylinder 4 is provided at its pressure end with the discharge port 5 which is adapted to be connected to the conduit leading to the wheel cylinders. The reservoir 2 is formed in its top with a fill opening which is closed by the cap 6 having the passageways 7 for placing the reservoir in communication with the atmosphere.

8 is a piston member having the pistons 9 and 10 slidable in the cylinders 3 and 4, respectively, each piston being provided with suitable sealing means, such as the rubber ring 11 located in an annular groove in the piston and bearing upon the associated cylinder. As shown, the pistons 9 and 10 are integral. The piston 10 is formed with the axial passageway 12 leading from its pressure end, with the diametrical passageway 13 spaced from the inner end of the passageway 12 and opening into the cylinder 3 and also with the axial passageway 14 for placing the passageway 12 in communication with the passageway 13. The passageways 12, 13 and 14 are adapted to place the cylinders 3 and 4 in communication with each other.

15 is a valve for controlling the communication between the cylinders 3 and 4. The valve has the stem 16 which extends axially within the passageway 12 and the conical head 17 which is adapted to engage a correspondingly shaped seat formed at an end of the passageway 14. The valve is guided by means of the spiders 18 and 19, the former being sleeved on the stem 16 adjacent the head 17 and the latter being fixed in the passageway 12 and slidably engaged by the stem 16. The valve is also guided by the cup-shaped guide 20 through the top of which the valve stem slidably extends. This guide, as shown, has an annular foot flange which is clamped between the end of the cylinder 4 and the nipple 21 in which the discharge port 5 is formed. The foot flange is provided with an annular series of ports 22. 23 is a coil spring encircling the stem 16 and abutting the spiders 18 and 19 and serving to yieldably urge the valve in a direction to close the communication port between the cylinders 3 and 4. However, the movement of the valve under actuation of the spring is limited by the head 24 upon the free end of the stem 16 engaging the top of the guide 20 so that when the pistons are in their normally retracted positions the communication port between the cylinders is open.

The piston member is adapted to be operatively connected to the usual foot pedal by the piston rod 25 which is positively connected to the piston member. The retraction of the piston member to its inoperative or off position is effected in the usual manner as by means of the usual retracting spring connected to the foot pedal.

For the purpose of controlling the communication between the reservoir 2 and the cylinder 3 of larger diameter so that the master cylinder will effectively supply fluid under pressure at a greater rate during the initial portion of the operation than during the final portion and so that the brake system will be effectively replenished with the braking fluid, the master cylinder is provided with a valve control device which is constructed as follows: 26 is a valve chamber formed in the body of the master cylinder between the cylinder member 1 and the reservoir 2 and having its axis substantially at right angles to that of the cylinder member. The axis, in the usual operating position of the master cylinder, is substantially horizontal. The valve chamber is adapted to communicate with the reservoir through the passageway 27 at the end of the valve chamber and is also adapted to communicate with the cylinder 3 of larger diameter through the passageway 28, which is spaced longitudinally from the passageway 27. 29 is a closure for the other end of the valve chamber, the closure comprising the head 30 outside the body of the master cylinder and the hollow stem 31 threaded into the body. 32 is a valve freely reciprocable within the valve chamber and having the stem 33 formed with the angularly spaced projections 34 slidably engageable with the wall of the hollow stem 31 for guiding the valve. The valve has the head 35 which is adapted to engage the adjacent end of the passageway 27. As shown, the head has a cone-shaped face engageable with a complementary face upon the insert 36 which forms a part of the passageway 27. To provide restricted communication between the reservoir and the cylinder 3 of larger diameter when the valve is in closed position and its head is in engagement with the insert, the head is formed with the restricted passageway 37 formed as by flattening a portion of the head. It will be noted that the thickness of the head 35 is appreciably less than the actual distance between the passageways 27 and 28 so that when the valve is in open position to provide unrestricted communication between the reservoir and the cylinder 3 of larger diameter the head is located in the space between the passageways. As a result, when the piston member is advanced to apply pressure to the braking fluid, the valve is moved in response to the flow of the fluid to closed position.

In operation, upon initial advance of the piston member 8, the pistons 9 and 10 are moved in unison and the communication port between the cylinders 3 and 4 will tend to close. The valve 32 during the initial advance is moved to closed position so that there is but limited communication between the reservoir and the cylinder 3 of larger diameter during the remainder of the advance of the piston member. As a result, during the remainder of the advance of the piston member, pressure is built up in the cylinder 3 of larger diameter forcing the valve 15 to remain open against the pressure of the spring 23. During the final portion of the advance, the pistons 9 and 10 are slowed up by reason of the brake system being filled so that the valve 15 closes owing to the unloading effect of the restricted passageway 37 and the pressure of the spring 23. Any further increase in pedal pressure to advance the piston member results in negligible movement of the pistons so that the restricted passageway 37 is able to maintain the cylinder 3 of larger diameter at a pressure equal to the atmospheric pressure plus the pressure exerted by the hydrostatic head of the braking liquid. The valve 15 being closed, all pedal pressure is transmitted through the piston 10. It will be obvious that the higher the rate of travel of the pistons 9 and 10, the greater the percentage of the volume of the braking fluid in the cylinder 3 of larger diameter which will be displaced through the valve 15 to the cylinder 4 of smaller diameter and, hence, the shorter the pedal travel required to set the brakes. During retraction, sub-atmospheric pressure exists in the cylinder portions 3 and 4 and, as a result, the valve 32 is moved to open position during the initial portion of the retraction so that the braking fluid can freely flow from the reservoir into the cylinder portions to effectively replenish the braking fluid. The return of the braking fluid from the wheel cylinders is at a sufficiently slow rate to avoid moving the valve to closed position.

The master cylinder illustrated in Figures 5 and 6 is formed in the same manner as that illustrated in Figures 1 to 4 inclusive, with the exception that the control valve 38 has the head 39 formed with flat faces for engaging the insert 40 which forms a part of the passageway between the reservoir and an end of the valve chamber. In this construction the face of the insert opposed to the valve head is formed with the aligned radial grooves 41 to produce a restricted passageway for the fluid when the valve is in closed position.

The master cylinder illustrated in Figures 7 and 8 differs essentially from that of Figures 1 to 4 inclusive, by forming the insert 42 at the inner end of the valve chamber to provide both the unrestricted and restricted passageways for the fluid. As shown, the insert has the axial opening 43 which forms the unrestricted passageway when the valve is in open position and the peripheral longitudinally extending groove 44 which forms the restricted passageway when the valve is in closed position.

In the modification illustrated in Figure 9, the valve chamber communicates with the fluid reservoir through the two passageways 45 and 46, the former being at the inner end of the valve chamber and the latter being adjacent thereto. The valve has at its inner end the head 47 which is adapted when the valve is in closed position to close the passageway 45. The valve also has intermediate its ends the enlargement 48 which has an external diameter slightly less than the diameter of the bore forming the valve chamber. This enlargement is located so that when the valve is in closed position the enlargement is between the opening 49 in the wall of the cylinder of larger diameter and the openings 45 and 46. As a result, the enlargement forms with the wall of the valve chamber a restricted passageway.

In the modification illustrated in Figure 10, the construction of the master cylinder is in general the same as that of Figures 1 to 4 inclusive, with the exception that the restricted passageway for the flow of the fluid from the cylinder of larger diameter to the fluid reservoir when the valve is in closed position is formed by the plug 50 in the upper wall of the valve chamber and provided with the axially restricted opening 51. It will be noted that in this construction the opening into which the plug 50 is threaded is in alignment with the opening 52 for placing the valve chamber in communication with the cylinder of larger diameter so that the opening 52 may be readily drilled.

What I claim as my invention is:

1. In a master cylinder, a cylinder member having cylinders of different diameters, a piston member having pistons slidable within said cylinders, a fluid reservoir, a valve chamber between the cylinder of larger diameter and said reservoir and having its axis substantially at right angles to the axis of the cylinder of larger diameter, a closure for the outer end of said valve chamber, a passageway at the inner end of said valve chamber for placing said valve chamber in communication with said reservoir, a second passageway spaced longitudinally of said valve chamber from said first mentioned passageway for placing said valve chamber in communication with the cylinder of larger diameter, and a valve movable in said valve chamber during movement of said piston member in response to flow of fluid, said valve during the suction stroke of said piston member occupying a position providing unrestricted communication between the cylinder of larger diameter and said reservoir through said passageways and said valve during the pressure stroke of said piston member occupying a position providing restricted communication between the cylinder of larger diameter and said reservoir.

2. In a master cylinder, a cylinder member having cylinders of different diameters, a piston member having pistons slidable in said cylinders, a fluid reservoir, a valve chamber between the cylinder of larger diameter and said reservoir, said valve chamber having its axis substantially at right angles to the axis and in a plane parallel to the plane of the axis of the cylinder of larger diameter, a removable closure for the outer end of said valve chamber, passageways spaced longitudinally of said valve chamber for placing said valve chamber in communication with the cylinder of larger diameter and said reservoir, and a valve movable longitudinally within said valve chamber in response to flow of fluid during movement of said piston member, said valve occupying during the suction stroke of said piston member a position providing unrestricted communication between the cylinder of larger diameter and said reservoir and occupying during the pressure stroke of said piston member a position providing restricted communication between the cylinder of larger diameter and said reservoir.

3. In a master cylinder, a cylinder member having cylinders of different diameters, a piston member having pistons slidable in said cylinders, a fluid reservoir, a valve chamber between the cylinder of larger diameter and said reservoir, a removable closure for the outer end of said valve chamber having a hollow stem extending within said valve chamber, means for placing said valve chamber in communication with said reservoir and the cylinder of larger diameter comprising an insert in said valve chamber having a passageway therethrough communicating with said reservoir and valve chamber, and a passageway spaced longitudinally of said valve chamber from said insert communicating with the cylinder of larger diameter and said valve chamber, a valve movable longitudinally within said valve chamber during movement of said piston member in response to flow of fluid, said valve having a portion guided by said hollow stem and a head, and cooperating means on said insert and head providing restricted communication between said reservoir and valve chamber when said head is in contact with said insert.

4. In a master cylinder, a cylinder member having cylinders of different diameters, a piston member having pistons slidable in said cylinders, a fluid reservoir, a valve chamber between the cylinder of larger diameter and said reservoir, a closure for the outer end of said valve chamber, means for placing said valve chamber in communication with said reservoir and the cylinder of larger diameter comprising an insert within said valve chamber having a passageway therethrough communicating with said reservoir and valve chamber, and a passageway spaced longitudinally of said valve chamber from said insert and communicating with said valve chamber and the cylinder of larger diameter, and a valve movable longitudinally within said valve chamber during movement of said piston member in response to flow of fluid, said valve having a head for contacting with said insert and provided with a flattened portion forming a restricted passageway when said head is in contact with said insert.

5. In a master cylinder, a cylinder member having cylinders of different diameters, a piston member having pistons slidable within said cylinders, a fluid reservoir, a valve chamber between the cylinder of larger diameter and said reservoir, a closure for the outer end of said valve chamber, a passageway in the inner end of said valve chamber opening into said reservoir, a second passageway in said valve chamber spaced longitudinally of said valve chamber from said first mentioned passageway and opening into said reservoir, a third passageway spaced longitudinally of said valve chamber from said first and second mentioned passageways and opening into said valve chamber and the cylinder of larger diameter, and a valve movable longitudinally within said valve chamber during movement of said piston member in response to flow of fluid, said valve having a head for closing said first mentioned passageway and an enlargement providing restricted communication between said second and third mentioned passageways in one position of said valve, said head and enlargement in another position of said valve providing unrestricted communication between said first and second mentioned passageways and said third mentioned passageway.

OWEN M. WHITTEN.